US009908801B2

(12) United States Patent
Gonzalez (10) Patent No.: US 9,908,801 B2
(45) Date of Patent: Mar. 6, 2018

(54) ELIMINATION OF SODIUM SULFATE FROM BIOLOGICALLY TREATED WASTEWATER (71) Applicant: CORN PRODUCTS DEVELOPMENT, INC., Westchester, IL (US)

(72) Inventor: Carlos Eduardo Hurtado Gonzalez, Shanghai (CN)

(73) Assignee: Corn Products Development, Inc., Westchester, IL (US)

( * ) Notice: Subject to any disclaimer, the term of this patent is extended or adjusted under 35 U.S.C. 154(b) by 291 days.

(21) Appl. No.: 14/261,931

(22) Filed: Apr. 25, 2014

(65) Prior Publication Data
US 2016/0221851 A1 Aug. 4, 2016
US 2017/0088451 A9 Mar. 30, 2017

(30) Foreign Application Priority Data
Apr. 26, 2013 (CN) .......................... 2013 1 0206368

(51) Int. Cl.
| C02F 9/00 | (2006.01) |
| C02F 1/28 | (2006.01) |
| C02F 1/44 | (2006.01) |
| C02F 3/12 | (2006.01) |
| C02F 1/42 | (2006.01) |
| C02F 1/52 | (2006.01) |
| C02F 1/38 | (2006.01) |

(Continued)

(52) U.S. Cl.
CPC .............. C02F 9/00 (2013.01); C02F 1/283 (2013.01); C02F 1/42 (2013.01); C02F 1/442 (2013.01); C02F 1/52 (2013.01); C02F 3/1268 (2013.01); C02F 1/385 (2013.01); C02F 3/1273 (2013.01); C02F 2001/425 (2013.01);
(Continued)

(58) Field of Classification Search
CPC .... C02F 9/00; C02F 1/283; C02F 1/42; C02F 1/442; C02F 1/52; C02F 1/385; C02F 3/268; C02F 3/1273; C02F 2001/5218; C02F 2001/101; C02F 2001/20; C02F 2001/30; C02F 2103/32; C02F 2103/36
See application file for complete search history.

(56) References Cited

U.S. PATENT DOCUMENTS 4,005,009 A * 1/1977 Kinoshita ................. C02F 1/24
                                                    210/705
4,340,442 A * 7/1982 Hart ........................ D01D 5/00
                                                    162/146

(Continued)

FOREIGN PATENT DOCUMENTS

| CN | 102417193 | 6/2013 |
| DE | 102010043662 A1 | 5/2012 |
| WO | WO201037156 A1 | 4/2010 |

OTHER PUBLICATIONS

Apell, Combined ion exchange treatment for removal of dissolved organic matter and hardness, Nov. 9, 2009, p. 1-2.*

(Continued)

Primary Examiner — Bobby Ramdhanie
Assistant Examiner — Donovan Bui-Huynh
(74) Attorney, Agent, or Firm — Jason Grauch; Jacqueline Cohen (57) ABSTRACT The application relates to a process comprising: treating a wastewater stream in a membrane bioreactor, treating the effluent from the previous step in a cationic on exchanger, and treating the effluent from the previous step in a nano-membrane filter.

15 Claims, 8 Drawing Sheets (51) Int. Cl.
C02F 101/10 (2006.01)
C02F 101/20 (2006.01)
C02F 101/30 (2006.01)
C02F 103/32 (2006.01)
C02F 103/36 (2006.01)

(52) U.S. Cl.
CPC .......... C02F 2001/5218 (2013.01); C02F 2101/101 (2013.01); C02F 2101/20 (2013.01); C02F 2101/30 (2013.01); C02F 2103/32 (2013.01); C02F 2103/36 (2013.01); Y02W 10/15 (2015.05)

(56) References Cited

U.S. PATENT DOCUMENTS

2003/0044343 A1* 3/2003 Babjak .................... C01D 5/00
423/551
2003/0205514 A1 11/2003 Potter et al.
2008/0128366 A1* 6/2008 Grott ....................... C02F 1/42
210/774
2012/0085701 A1* 4/2012 Evans ................. B01D 61/022
210/605

OTHER PUBLICATIONS

Visvanathan, Membrane Separation Bioreactors for Wastewater Treatment, Jun. 3, 2010, p. 1-3, 14-16, 25-26, 31.*
Membrane Specialists, Feb. 8, 2010, p. 1.*
Search Report of Chinese Patent Appln. 201310206368.9 filed Apr. 26, 2013—Applicant: Corn Products Development, Inc.
English translation Abstract of Chinese Publication No. CN102232061A located at Orbit.Com on Aug. 5, 2015.
English translation of Abstract of Chinese Patent Publication No. CN20284908U located at Orbit.Com on Aug. 5, 2015.
Search Report of EP Patent Appln. 14165061.4 filed on Apr. 26, 2013—Applicant is Corn Products development, Inc.

* cited by examiner

ELIMINATION OF SODIUM SULFATE FROM BIOLOGICALLY TREATED WASTEWATER

CROSS REFERENCE TO RELATED APPLICATIONS

This application claims priority to Chinese Patent Application No. 201310206368.9, filed on 26 Apr. 2013.

INTRODUCTION

The hydroxyl-propylated starch (HPS) production process uses sodium sulfate to improve reaction efficiencies and to protect the starch from gelling at high titration and propylene oxide levels. Wastewater resulting from the production of hydroxyl-propylated starches contain high concentrations of organic material and sodium sulfate so are unusually resistant to wastewater treatment processes. The sodium sulfate cannot be degraded through the biological process and ends up in the effluent. In China, Australia, Thailand, Brasil, and and other countries there are strict sulfate limits in the wastewater. There is currently not a commercial method able to remove the sulfate economically from this wastewater.

Inexpensive methods for removing ions from water by lime or limestone precipitation fail because of the high solubility of sulfate salts in water. For example, the equilibrium concentration of sulfate calculated from the calcium sulfate solubility constant is about 1,500 mg/L. This is a much higher value than the 500 mg/L standard for wastewater in China or the US EPA secondary standard of 250 mg/L for drinking water. Sulfate precipitation may be accomplished using reagents which form more insoluble salts than calcium sulfate. For example, addition of barium carbonate or strontium carbonate will result in precipitation of barium sulfate or strontium sulfate respectively. This method of sulfate removal is typically not used due to the high cost of the reagents and the concern about heavy metal toxicity.

Sulfate removal using calcium aluminate ("the Walhalla process") has been successful in limited applications. The process works best with sulfate levels of 500 mg/L to 5,000 mg/L and with with sodium concentrations of less than 500-1000 mg/L. The Walhalla process is a three-step process involving lime precipitation, calcium aluminate precipitation at pH 11.2 with lime consumption, and postprecipitation carbonation/calcium carbonate precipitation with carbon dioxide. High operating costs are partially due to the high cost of the calcium aluminate reagent.

Sulfate ion removal using ion exchange with a weak base anion exchange resin is both expensive and impractical because of organic fouling of the anion exchange resin with wastewater having a high chemical oxygen demand or COD. The lower ion exchange capacities for the sulfate ion of these resins also make this an impractical choice. Membrane technology, particularly nanofiltration membranes have been shown to be very effective in sulfate ion removal. Sulfate metal ions can be separated from the wastewater into the retentate stream, typically about 98-99% of the sulfate ions are rejected by nanofiltration membranes. However, again rapid fouling of the nanofiltration membrane with wastewater having a high chemical oxygen demand or COD makes this an impractical choice.

Masaru et al. in FR 2556 980 A1 teaches treating lysine fermentation liquid with a salt-type, strongly acidic, cation exchange resin, passing that of through a semipermeable membrane such as an ultrafilter, concentrating using a reverse osmotic membrane, and then electrodialysis to remove 91% of the inorganic material, including sulfate, from the waste stream. Green et al. in WO 00/00273 A1 teaches a process in which a feed containing dissolved sulfate ions is subjected to membrane filtration, the first retentate is subjected to a precipitation process, and the supernatant is subjected to further membrane filtration. Sumio in JP 54-069578 A teaches treatment of wastewater from potato or corn starch manufacturing by passing the wastewater through a filter medium made of copper with a number of openings, e.g., woven or unwoven cloth, or net, and treatment with a semipermeable membrane. Gawaad et al., ARPN J. Eng. Appl. Sci., 6 (11), 1-6, 2011 evaluated a nano membrane and a reverse osmosis membrane for concentrating the wastewater to recover sodium sulfate for reuse. Hendrix et al. in U.S. Pat. No. 5,346,620, issued Sep. 13, 1994 teach treating wastewater by removing sodium sulfate, bacterial pre-treatment to initially reduce TOC content and subsequently to pre-treatment denitrification followed by nitrification.

SUMMARY

In one aspect, the application provides a process comprising: a) treating a wastewater stream with high organic content in a membrane bioreactor, b) treating the effluent from step a) in a cationic ion exchanger, and c) treating the effluent from step b) in a nanomembrane filter.

DETAILED DESCRIPTION

In one aspect, the application provides a process comprising:
  a) treating a wastewater stream with high organic content in a membrane bioreactor,
  b) treating the effluent from step a) in a cationic ion exchanger, and
  c) treating the effluent from step b) in a nanomembrane filter.

In one embodiment, the wastewater stream with high organic content has a Chemical Oxygen Demand (COD) of from about 1,000 to about 30,000 mg ($O_2$)/L. In another embodiment, the wastewater stream with high organic content has a Chemical Oxygen Demand (COD) from about 5,000 to about 25,000 mg ($O_2$)/L. In another embodiment, the wastewater stream with high organic content has a Chemical Oxygen Demand (COD) from about 7,500 to about 20,000 mg ($O_2$)/L. In another embodiment, the wastewater stream with high organic content has a Chemical Oxygen Demand (COD) from about 9,000 to about 19,000 mg ($O_2$)/L. In yet another embodiment, the wastewater stream with high organic content has a Chemical Oxygen Demand (COD) from about 10,000 to about 18,000 mg ($O_2$)/L.

In one embodiment, the membrane pore size of the membrane bioreactor is from about 1 μm to about 0.02 μm. In another embodiment, the membrane pore size is from about 0.7 μm to about 0.025 μm. In another embodiment, the membrane pore size is from about 0.5 μm to about 0.03 μm. In another embodiment, the membrane pore size is from about 0.4 μm to about 0.03 μm.

In one embodiment, the membrane of the membrane bioreactor is of tubular configuration, spiral configuration, hollow fiber configuration, or flat sheet configuration. In another embodiment, the membrane of the membrane bioreactor is of hollow fiber configuration.

In one embodiment, the trans membrane pressure of the membrane bioreactor is from about 10 kPa to about 600 kPa. In another embodiment, the trans membrane pressure of the membrane bioreactor is from about 20 kPa to about 500 kPa. In another embodiment, the trans membrane pressure of the membrane bioreactor is from about 30 kPa to about 400 kPa. In another embodiment, the trans membrane pressure of the membrane bioreactor is from about 40 kPa to about 80 kPa.

In one embodiment, the cationic ion exchanger is of the carboxylic acid, aminophosphonic acid, iminodiacetic acid, or sulfonic acid type. In another embodiment, the cationic ion exchanger is of the sulfonic acid type. In one embodiment, the cationic ion exchanger is in the sodium form. In another embodiment, the cationic ion exchanger is of the sulfonic acid type and is in the sodium form.

In one embodiment, the nanomembrane filter has a molecular weight cut-off of from about 200 daltons to about 15,000 daltons. In another embodiment, the nanomembrane filter has a molecular weight cut-off of from about 200 daltons to about 1,000 daltons. In another embodiment, the nanomembrane filter has a molecular weight cut-off of from about 200 daltons to about 500 daltons. In another embodiment, the nanomembrane filter has a molecular weight cut-off of from about 400 daltons to about 500 daltons.

In one embodiment, the pressure drop in the nanomembrane filter is from about 1 kPa to about 6,000 kPa. In another embodiment, the pressure drop in the nanomembrane filter is from about 100 kPa to about 5,000 kPa. In another embodiment, the pressure drop in the nanomembrane filter is from about 1,000 kPa to about 4,500 kPa. In another embodiment, the pressure drop in the nanomembrane filter is from about 1,300 kPa to about 4,100 kPa.

In one embodiment, the temperature of the process is from about 15° C. to about 45° C. In another embodiment, the temperature of the process is from about 20° C. to about 40° C.

In one embodiment, the effluent from step c) has a sodium sulfate concentration less than 500 mg/L. In another embodiment, the effluent from step c) has a sodium sulfate concentration about 235 mg/L.

In one embodiment, the process further comprises isolation of sodium sulfate decahydrate. In another embodiment, the isolation is by a crystallization process. In another embodiment, the temperature of the crystallization process is from about 0° C. to about 5° C. In another embodiment, the purity of the isolated sodium sulfate decahydrate is greater than 99%. In another embodiment, the purity of the isolated sodium sulfate decahydrate is greater than 99.5%. In another embodiment, the purity of the isolated sodium sulfate decahydrate is about 99.6%.

In one embodiment, the wastewater stream with high organic content is from starch processing. In another embodiment, the wastewater stream with high organic content is from corn starch processing. In another embodiment, the wastewater stream with high organic content is from hydroxyl-propylated starch (HPS) production.

In one embodiment, a process using different types of membranes (MBR/nanofiltration), softener, chilling, crystallization, centrifugation has been developed to remove sodium sulfate from the effluent of a biological process. In one embodiment, a process of this application has been tested at pilot plant scale and after 4 weeks of evaluation proved to be a technical solution. In one embodiment, no issues with membrane blockages have been experienced during the operation of the system.

In one embodiment, the process of this application removes nearly all particulate bigger than 0.04 μm using special membranes in a membrane bioreactor. In one embodiment, the membrane bioreactor process is then followed by an ion exchange system to remove calcium and magnesium ions. In another embodiment, once the calcium and magnesium have been removed, the sulfate is concentrated using a nanomembrane filtration process. The removal of particulates, calcium and magnesium allows the operation of the nanofiltration unit without the nanofilters getting blocked. Once the sodium sulfate reaches a concentration of about 80000 mg/L through the nanofiltration process, the highly concentrated sulfated stream is chilled and the sodium sulfate decahydrate allowed to crystallize in a crystallizer. The crystallized sodium sulfate decahydrate is then separated using a centrifuge.

In one embodiment of the application, the membrane bioreactor removes enough total phosphate and chemical oxygen demand from the wastewater stream to be in compliance with the People's Republic of China state pollutant discharge standard "Discharge Standard of Water Pollutants for Starch Industry" (Gb 25461-2010). In another embodiment, no Granulated Activated Carbon or Granulated Ferric Oxide unit is needed to polish the final wastewater stream.

In one embodiment of the application, the membrane bioreactor removes all types of bacteria from the wastewater stream. In another embodiment, the membrane pore size of the membrane bioreactor is about 0.04 microns.

In one embodiment of the application, the cationic ion exchanger reduces magnesium ion and calcium ion concentration from the wastewater stream from about 100 mg/L to less than 1 mg/L. In another embodiment, this reduction protects the nanomembrane filter from becoming blocked during operation.

In one embodiment of the application, the nanomembrane filter is able to remove chemical oxygen demand from wastewater stream to a value below 250 mg/L.

In one embodiment of the application, the initially crystallized sodium sulfate decahydrate purity exceeds the purity of sodium sulfate currently used. In another embodiment, the initially crystallized sodium sulfate decahydrate has a propylene chlorohydrins content below 0.08 mg/L. In another embodiment, the initially crystallized sodium sulfate decahydrate has a heavy metal concentration below legal limits. In another embodiment, the initially crystallized sodium sulfate decahydrate is not washed.

In one embodiment of the application, the recovered sodium sulfate decahydrate is recycled back to the hydroxyl-propylated starch reactors.

In one embodiment of the application, the sodium sulfate concentration in the wastewater stream is controlled below the Shanghai Discharge Standard for Municipal Sewerage System (DB31/445-2009) limit. In another embodiment, the sodium sulfate concentration in the wastewater stream is less than 500 mg/L.

The sodium sulfate decahydrate crystals of the present application have a purity greater than 99%. In one embodiment, effluent from the crystallization process is passed through a cationic ion exchanger and a granulated activated carbon system to remove calcium, magnesium, organics, and heavy metals. In another embodiment, the crystallized sodium sulfate decahydrate is dissolved and then reused in the production of hydroxyl-propylated starches.

The concentration of sodium sulfate using nanofiltration membranes, chilling, crystallization, and centrifugation are part of a process in the chemical industry during the production of sodium hydroxide. In the present application, the added unit processes to achieve the removal of sodium sulfate from a biological process include an membrane bioreactor unit, a softener at the front end of the process, and a polishing step using a Granulated Activated Carbon unit at the end of the process to remove organics (e.g. propylene chlorohydrins and/or colorants) and heavy metals. In one embodiment, cooling towers, ice storage system, and dissolution of sodium sulfate decahydrate are used to make the process less expensive.

Definitions

The following definitions are used in connection with the compounds of the present application unless the context indicates otherwise. The acronym "COD" means Chemical Oxygen Demand. The acronym "GAC" means Granulated Activated Carbon. The acronym "GFO" means Granulated Ferric Oxide. The acronym "MBR" means Membrane Bio-Reactor. The acronym "NF" means Nanomembrane Filter. The acronym "PCH" means propylene chlorohydrins. These include both 2-chloro-1-propanol and 1-chloro-2-propanol (sec-propylene chlorohydrin). The acronym "TDS" means total dissolved solids, which includes sodium sulfate. The acronym "TP" means Total Phosphorous content. The acronym "TSS" means Total Suspended Solids content.

As used herein, the term "membrane filtration" is intended to mean mechanical separation processes for separating gaseous or liquid streams that use permeable membranes. These include reverse osmosis (RO), which offers the finest degree of separation, followed by nanofiltration (NF), ultrafiltration (UF), and microfiltration (MF), which has membranes with the largest pore size. Membranes come in four basic configurations—tubular, spiral, hollow fiber, and flat sheet. Each is configured differently, both in packaging and in the types of materials used, to address the range of physical characteristics found in process fluids.

As used herein, the term "hollow fiber membrane" is intended to mean micro-thin tubules with porous walls. In one embodiment, the tubules (fibers) are about 1 mm thick. Hollow fibers can operate with flows from "inside-to-outside" or from "outside-to-inside".

As used herein, the term "ion exchanger" is intended to mean equipment capable of purification, separation, and decontamination of aqueous and other ion-containing solutions with solid polymeric or mineral "ion exchangers". Typical "ion exchangers" are ion exchange resins (functionalized porous or gel polymer), zeolites, montmorillonite clay, or soil humus. A "cationic ion exchanger" exchange positively charged ions (cations). There are both strong acid cationic ion exchangers and weak acid cationic ion exchangers. Types of gel polymer ion exchange resin are the styrene-divinylbenzene based and polyacrylic resins. A strongly acidic cationic ion exchange resin is typically substituted with sulfonic acid groups. A weakly acidic cationic ion exchange resin is typically substituted with carboxylic acid groups. Ion exchange is a reversible process and the ion exchanger can be regenerated or loaded with desirable ions by washing with an excess of these ions.

As used herein, the term "membrane bioreactor" or "MBR" is intended to mean the combination equipment capable of a membrane process like microfiltration or ultrafiltration with a suspended growth bioreactor.

As used herein, the term "nanomembrane filter" is intended to mean equipment capable of nanofiltration or NF. Nanofiltration is a cross-flow filtration technology which ranges somewhere between ultrafiltration (UF) and reverse osmosis (RO). The nominal pore size of the membrane is typically about 1 nanometer. Nanofiltration membranes are typically rated by molecular weight cut-off (MWCO) rather than nominal pore size. The MWCO is typically less than 1000 atomic mass units (daltons). Nanofiltration will remove polyvalent cations removal and remove both natural organic matter and synthetic organic matter from the feed stream.

As used herein, the term "treating" is intended to mean removing impurities such as sulfate ions, organic matter, sodium ions, particulates, etc. from water.

As used herein, the term "wastewater stream with high organic content" is intended to mean a wastewater stream with a Chemical Oxygen Demand (COD) of from about 1,000 to about 30,000 mg ($O_2$)/L.

Figure 3:
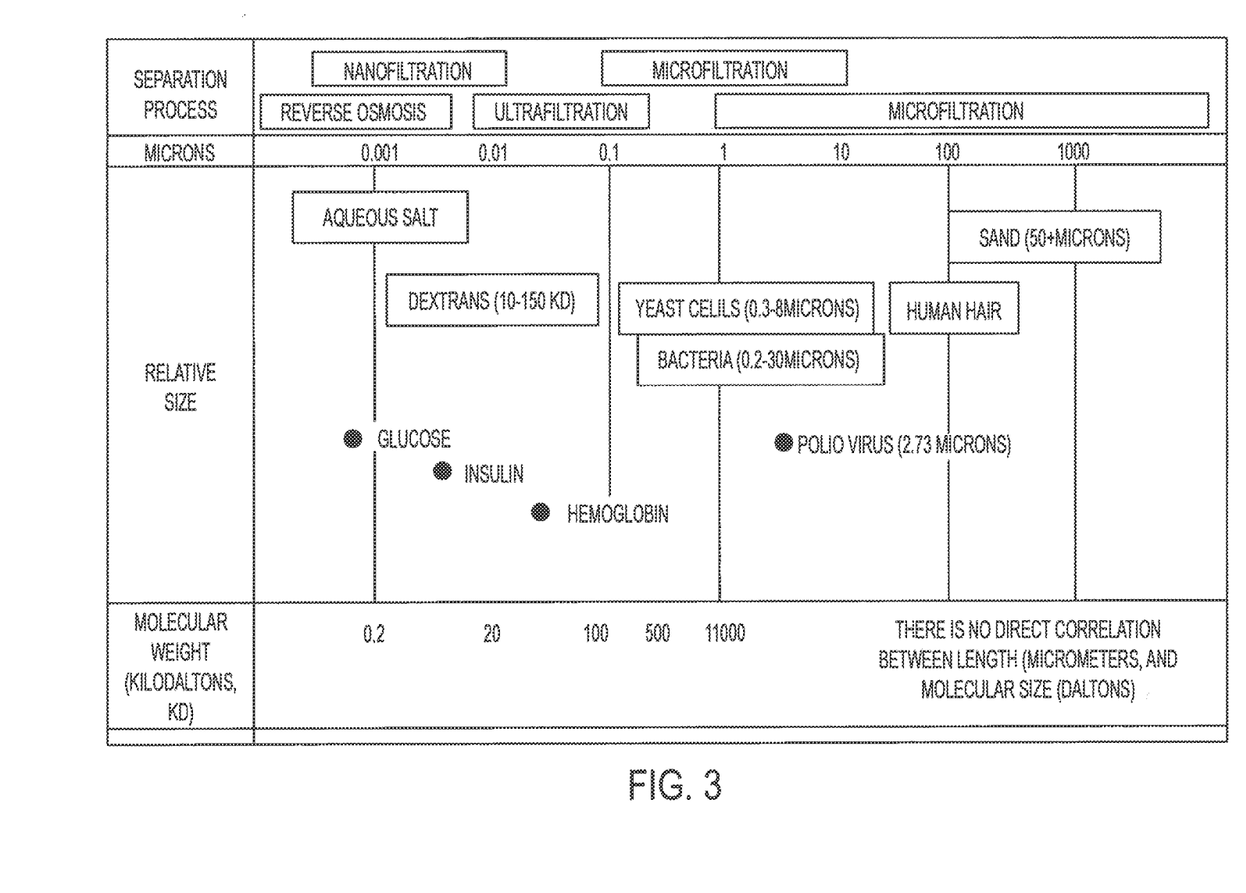
FIG. 3 depicts the relationship among pore size, molecular weight cut-off, and different filtration membranes.

There is no art recognized standard but membrane systems are generally placed into one of five categories based on particle size removal. These categories as they go from larger to smaller particles are generally referred to as particle filtration (PF), microfiltration (MF), ultrafiltration (UF), nanofiltration (NF), and reverse osmosis (RO). There is some overlap between these categories. A diagram illustrating these categories is shown in FIG. 3.

Certain specific aspects and embodiments of the present application will be explained in greater detail with reference to the following examples, which are provided only for purposes of illustration and should not be construed as limiting the scope of the application in any manner. Reasonable variations of the described procedures are intended to be within the scope of the present invention. While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES

Figure 1:
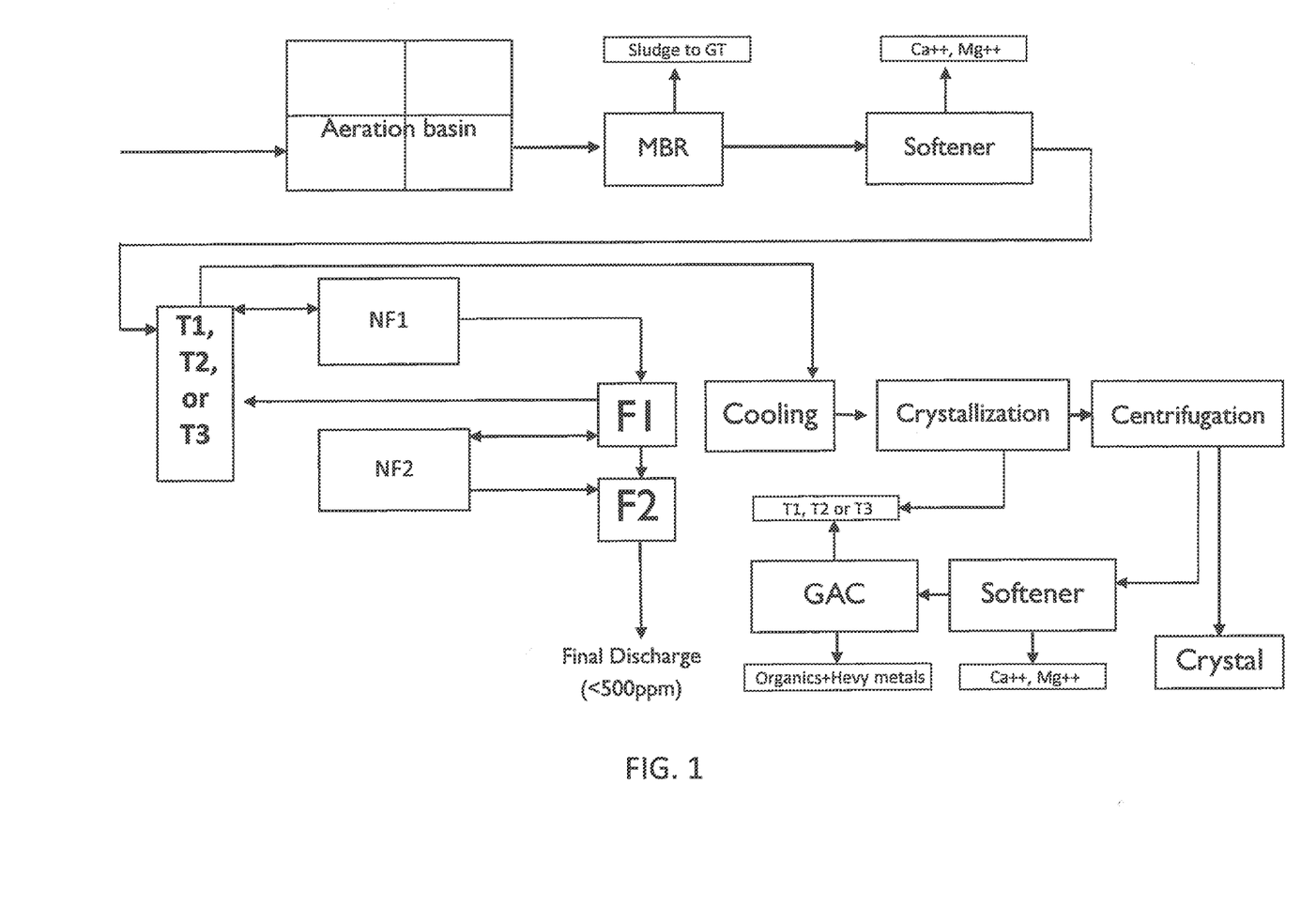
FIG. 1 depicts a process flow diagram of a semi-continuous system for the present application.

All parts and percentages are given by weight and all temperatures in degrees Celsius (° C.) unless otherwise noted. In FIG. 1, a flow diagram showing a semi-continuous process of the present application is shown. This can operation optionally in batch mode and allows for optional crystallization of sodium sulfate decahydrate. MBR is the membrane bioreactor; softener is the ion exchanger; T1, T2, and T3 are surge tanks; NF1 and NF2 are nanofiltration units; F1 and F2 are filtrate tanks from the nanofiltration process, cooling is the optional refrigeration unit; crystallization is the optional crystallizer unit; centrifugation is the optional centrifuge unit, which is used to isolate the crystalline sodium decahydrate; and GAC is an optional granulated active carbon unit. Analysis of a crystalline sodium sulfate decahydrate produced by this process is shown in Table 1.

TABLE 1 crystallized sample analytical results

| | observed | standard |
|---|---|---|
| $Na_2SO_4 \cdot 10\ H_2O$ | 99.6 | >99.0 |
| moisture (%) | 55.6 | NA |
| non-soluble | 0.02 | 0.05 |
| chloride (%) | 0.003 | 0.35% max |
| $Mg^{+2}$ (%) | 0.004 | 0.15% max |
| total heavy metals (as Pb %) | 0.0003 | 10 mg/L max |
| As (%) | 0.00001 | 3 mg/L max |
| Fe (%) | 0.00005 | 20 mg/L max |
| Pb (%) | 0.00004 | 2 mg/L max |
| Se (%) | 0.00005 | 0.003% max |

Figure 2:
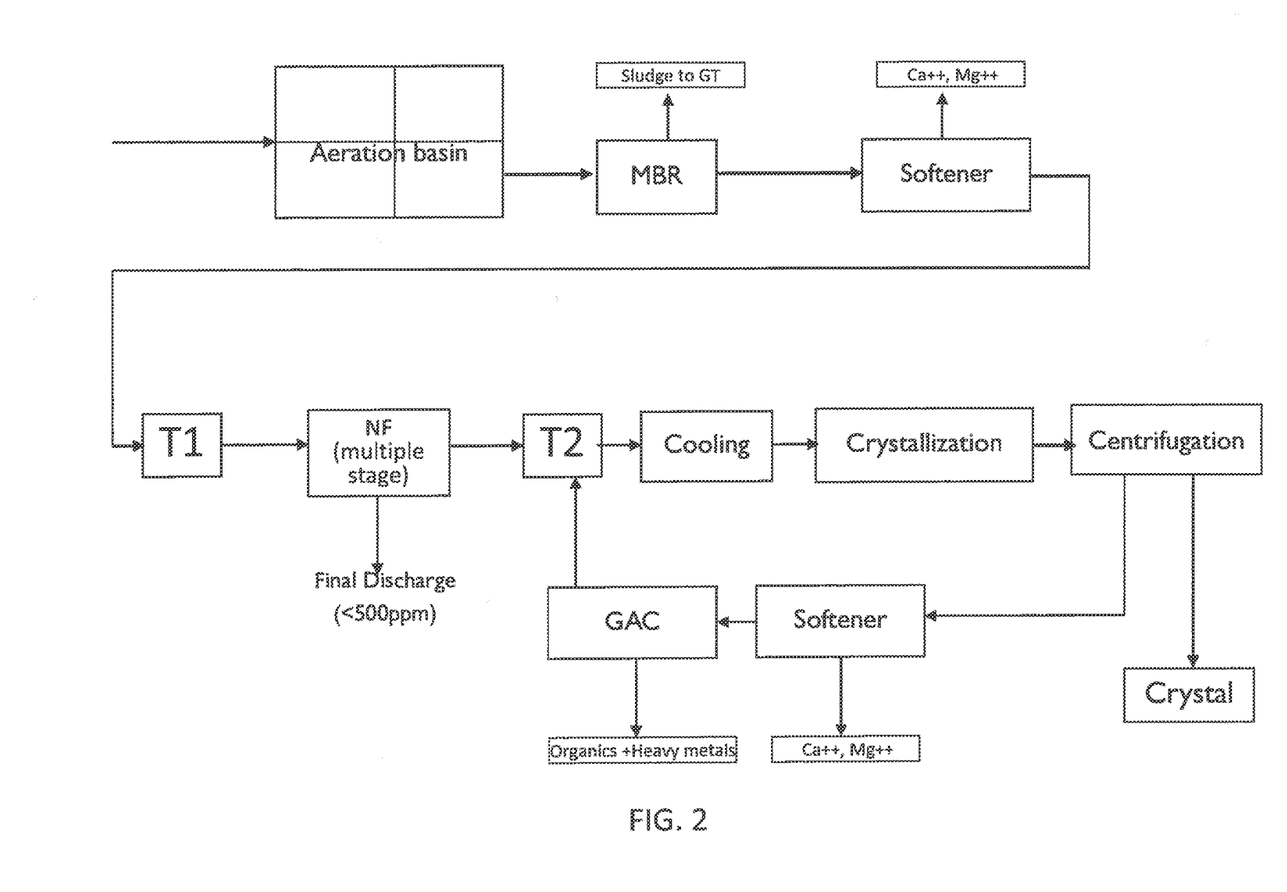
FIG. 2 depicts a process flow diagram of continuous system for the present application.

In FIG. 2, a flow diagram showing a continuous process of the present application is shown. MBR is the membrane bioreactor; softener is the ion exchanger; T1 and T2 are surge tanks; NF is a multiple stage nanofiltration unit; cooling is the refrigeration unit; crystallization is the crystallizer unit; centrifugation is the centrifuge unit, which is used to isolate the crystalline sodium decahydrate; and GAC is an optional granulated active carbon unit.

Figure 4:
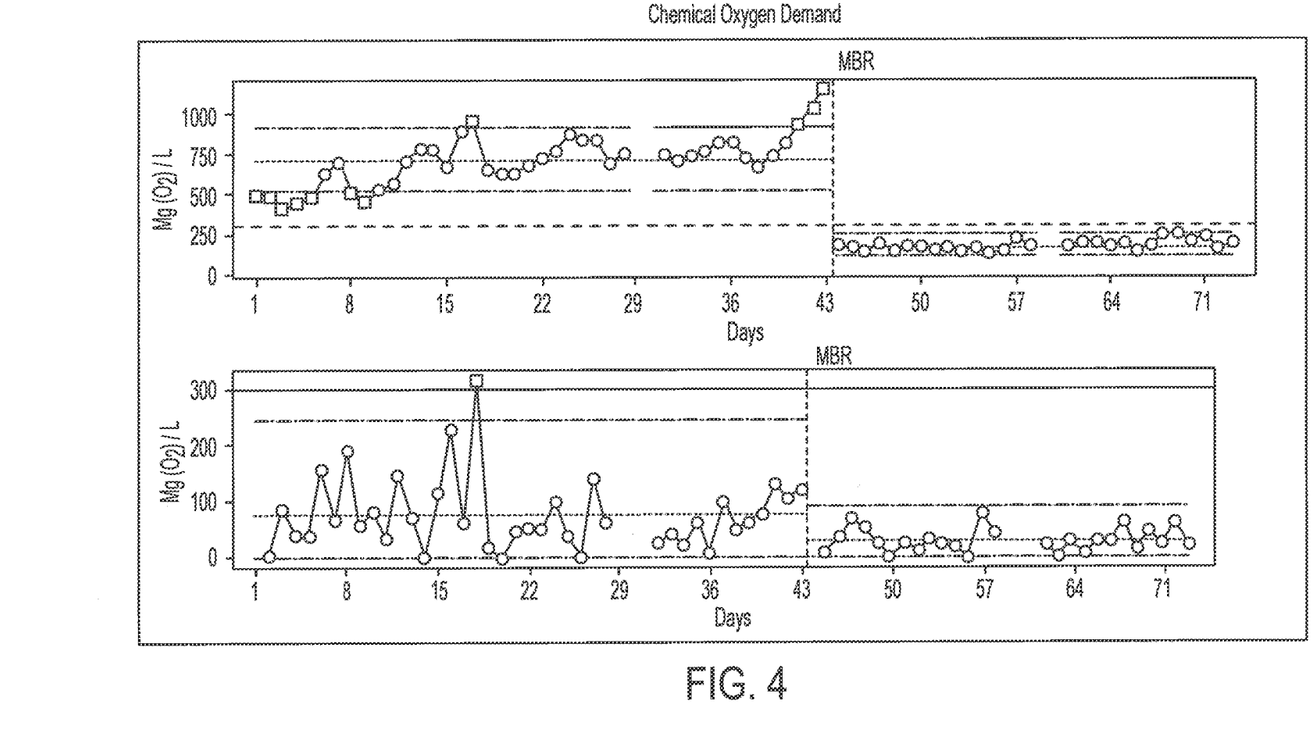
FIG. 4 depicts Chemical Oxygen Demand during operation of a process of the present application.
Figure 5:
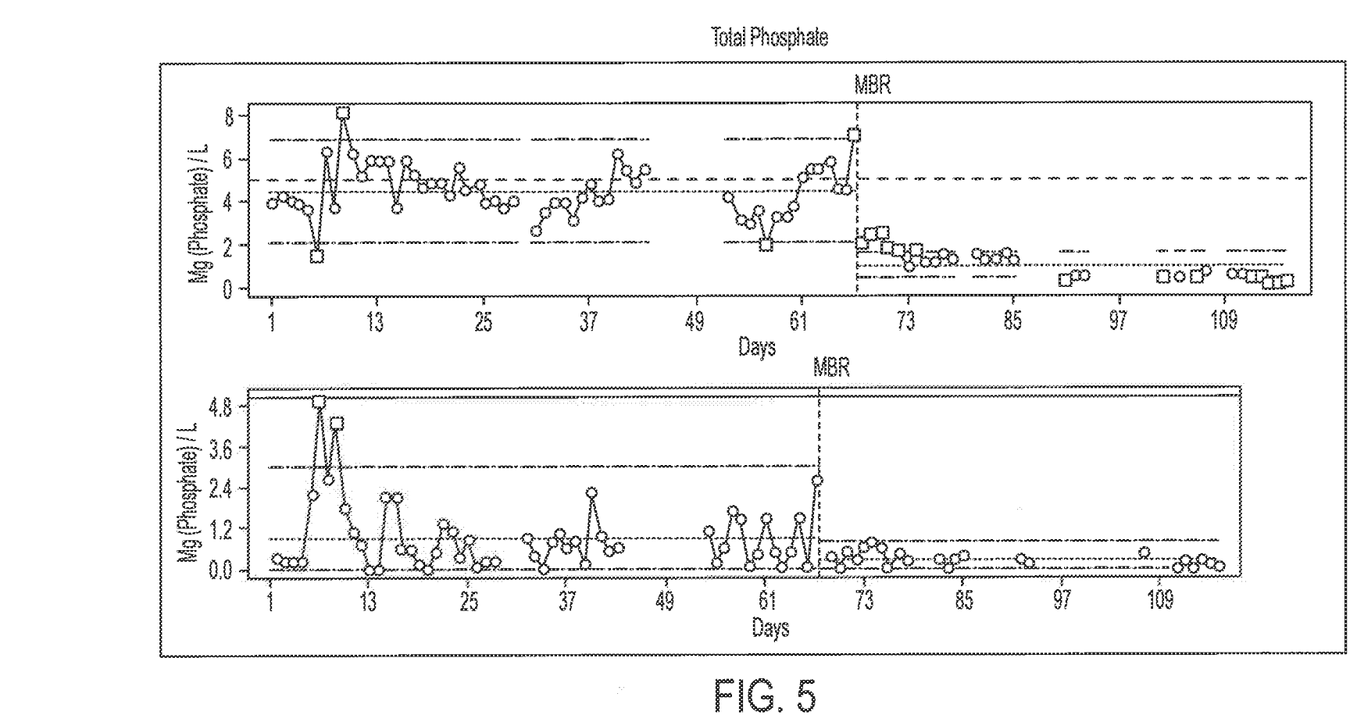
FIG. 5 depicts Total Phosphorus content during operation of a process of the present application
Figure 6:
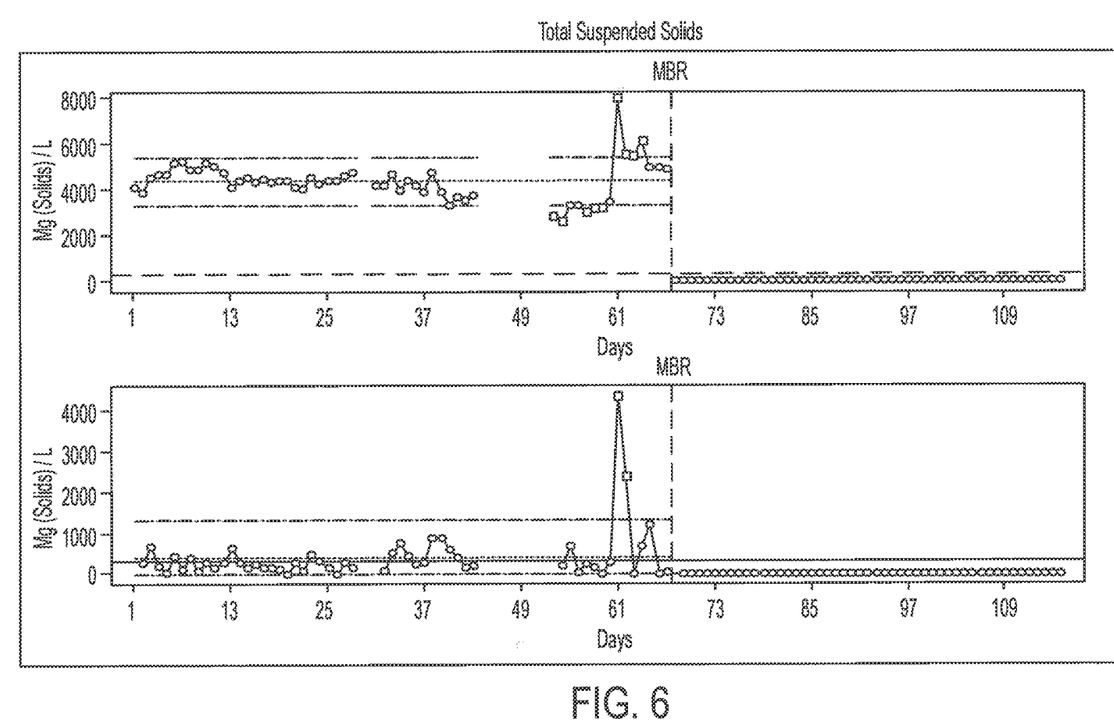
FIG. 6 depicts Total Suspended Solids content during operation of a process of the present application.
Figure 7:
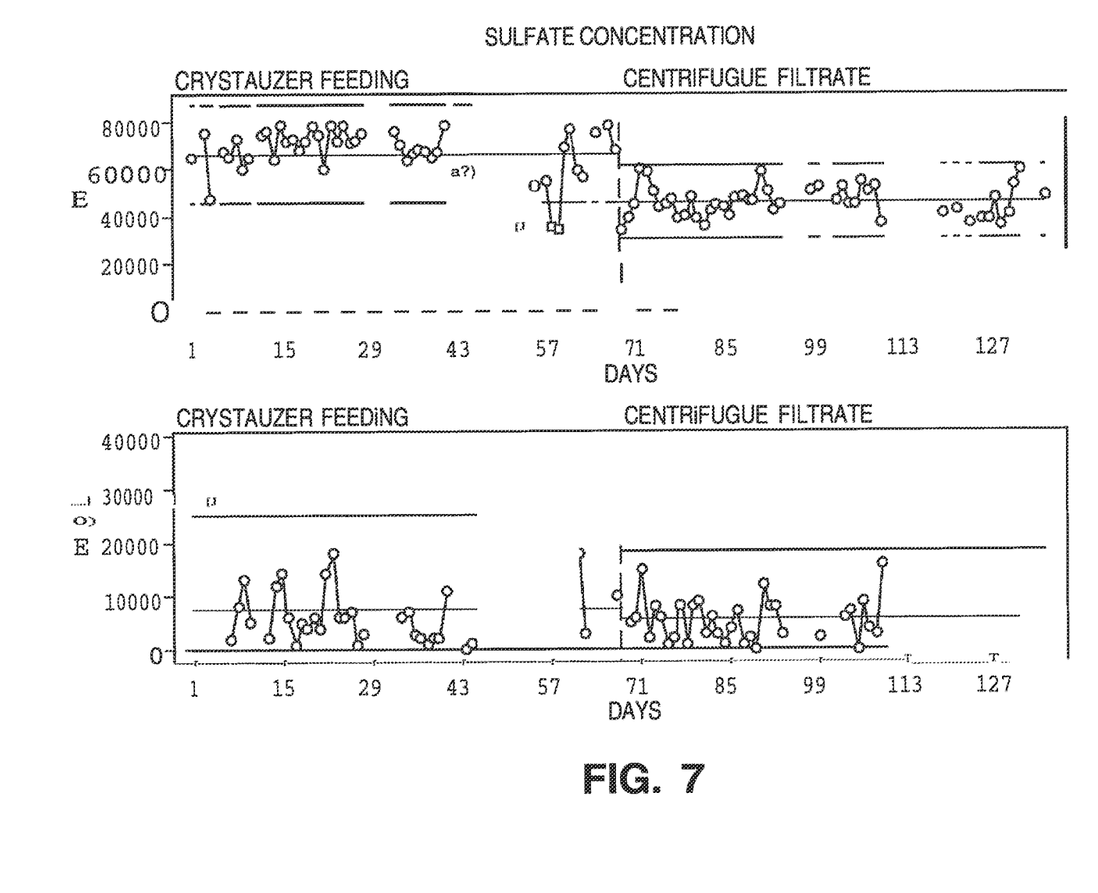
FIG. 7 depicts sulfate content during operation of a process of the present application.
Figure 8:
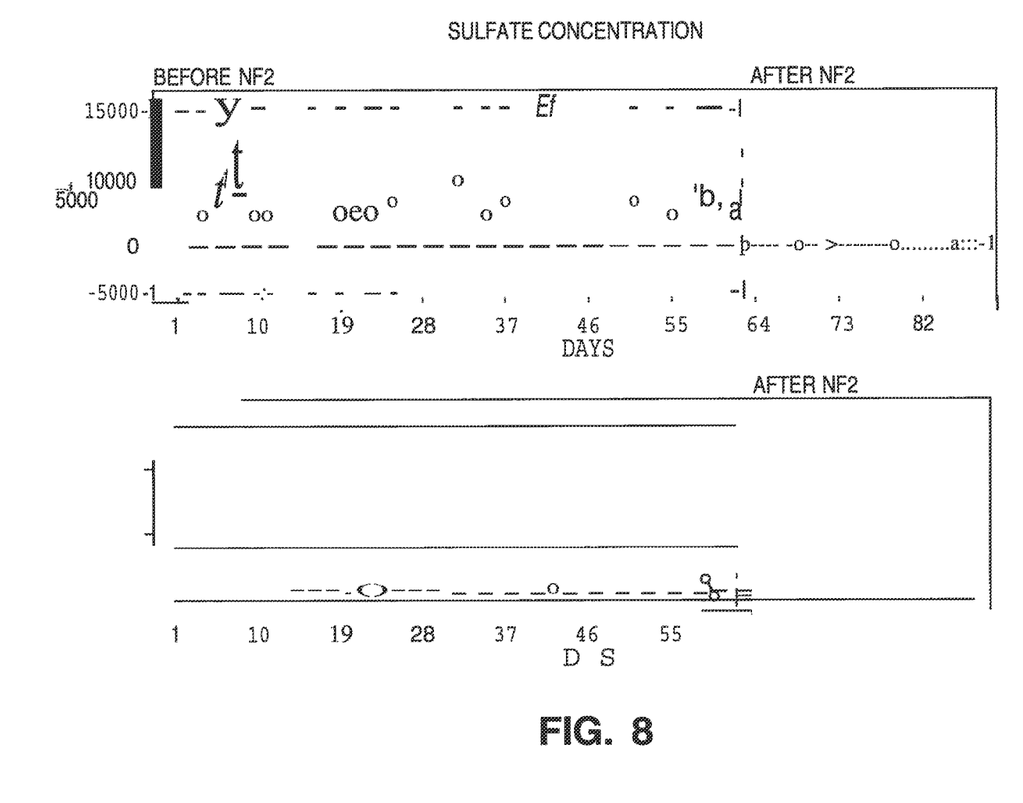
FIG. 8 depicts sodium sulfate content during operation of a process of the present application.

In FIG. 4, FIG. 5, and FIG. 6 process parameters measured during operation of a process of the present application are shown. The vertical dashed line labeled MBR represents before (left) and after (right) the membrane bioreactor was installed in the wastewater stream.

Throughout this application, various publications are referenced. The disclosures of these publications in their entireties are hereby incorporated by reference into this application in order to more fully describe the state of the art as known to those skilled therein as of the date of the application described and claimed herein.

While particular embodiments of the present application have been illustrated and described, it would be obvious to those skilled in the art that various other changes and modifications can be made without departing from the spirit and scope of the application. It is therefore intended to cover in the appended claims all such changes and modifications that are within the scope of this application.

What is claimed is:

1. A process comprising:
   a. treating a wastewater stream from a hydroxyl-propylated starch production process having high organic content and sodium sulfate in a membrane bioreactor,
   b. b) treating the effluent from step a) in a cationic ion exchanger, and
   c. c) treating the effluent from step b) in a nanofiltration unit to produce an effluent and a retentate,
   d. d) treating the wastewater stream in an aerobic biological system prior to step a);

wherein the sodium sulfate content of the effluent of step c) has been reduced to a concentration of less than 235 mg/L;

wherein the nanofiltration unit concentrates sodium sulfate in the retentate such that sodium sulfate can be recovered from the retentate as sodium sulfate decahydrate at a purity of greater than 99%;

wherein the sodium sulfate decahydrate is recycled back into the hydroxyl-propylated starch production processing;

and wherein the nanofiltration unit comprises a nanomembrane filter having a molecular weight cut-off of from about 200 Daltons to about 500 Daltons.

2. The process of claim 1 wherein the membrane pore size of the membrane bioreactor is from about 1 μm to about 0.02 μm.

3. The process of claim 2 wherein the membrane pore size is from about 0.4 μm to about 0.03 μm.

4. The process of claim 1 wherein the membrane of the membrane bioreactor is of tubular configuration, spiral configuration, hollow fiber configuration, or flat sheet configuration.

5. The process of claim 1 wherein the transmembrane pressure of the membrane bioreactor is from about 10 kPa to about 600 kPa.

6. The process of claim 1 wherein the cationic ion exchanger is of the carboxylic acid, amniophosphonic acid, iminodiacetic acid, or sulfonic acid type.

7. The process of claim 6 wherein the cationic ion exchanger is in the sodium form.

8. The process of claim 1 wherein the pressure drop in the nanomembrane filter is from about 1 kPa to about 4000 kPa.

9. The process of claim 1 wherein the temperature of the process from about 15° C. to about 45° C.

10. The process of claim 1 wherein the isolation is by a crystallization process.

11. The process of claim 10 wherein the temperature of the crystallization process is from about 0° C. to about 5° C.

12. The process of claim 10 wherein the sodium sulfate decahydrate is isolated in a centrifuge.

13. The process of claim 12 further comprising passing the filtrate from the centrifuge through a cationic ion exchanger and through a granulated active carbon unit.

14. The process of claim 1 further comprising treating the effluent from step c) in a chiller/crystallizer system.

15. The process of claim 14 further comprising treating the effluent from the chiller/crystallizer system in a centrifuge.

* * * * *